Figure 1:
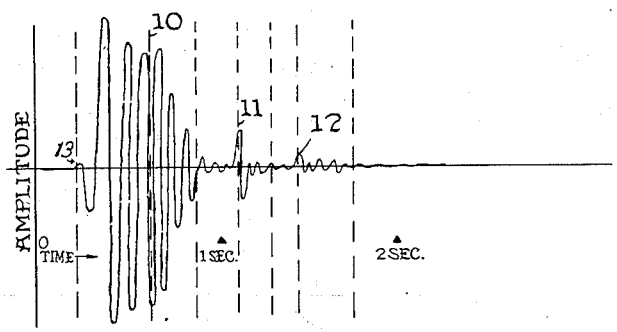

March 17, 1942.  R. D. WYCKOFF  2,276,709
APPARATUS FOR AND METHOD OF SEISMOGRAPH PROSPECTING
Filed Oct. 14, 1940  2 Sheets-Sheet 1

Inventor
Ralph D. Wyckoff,
By
his Attorney

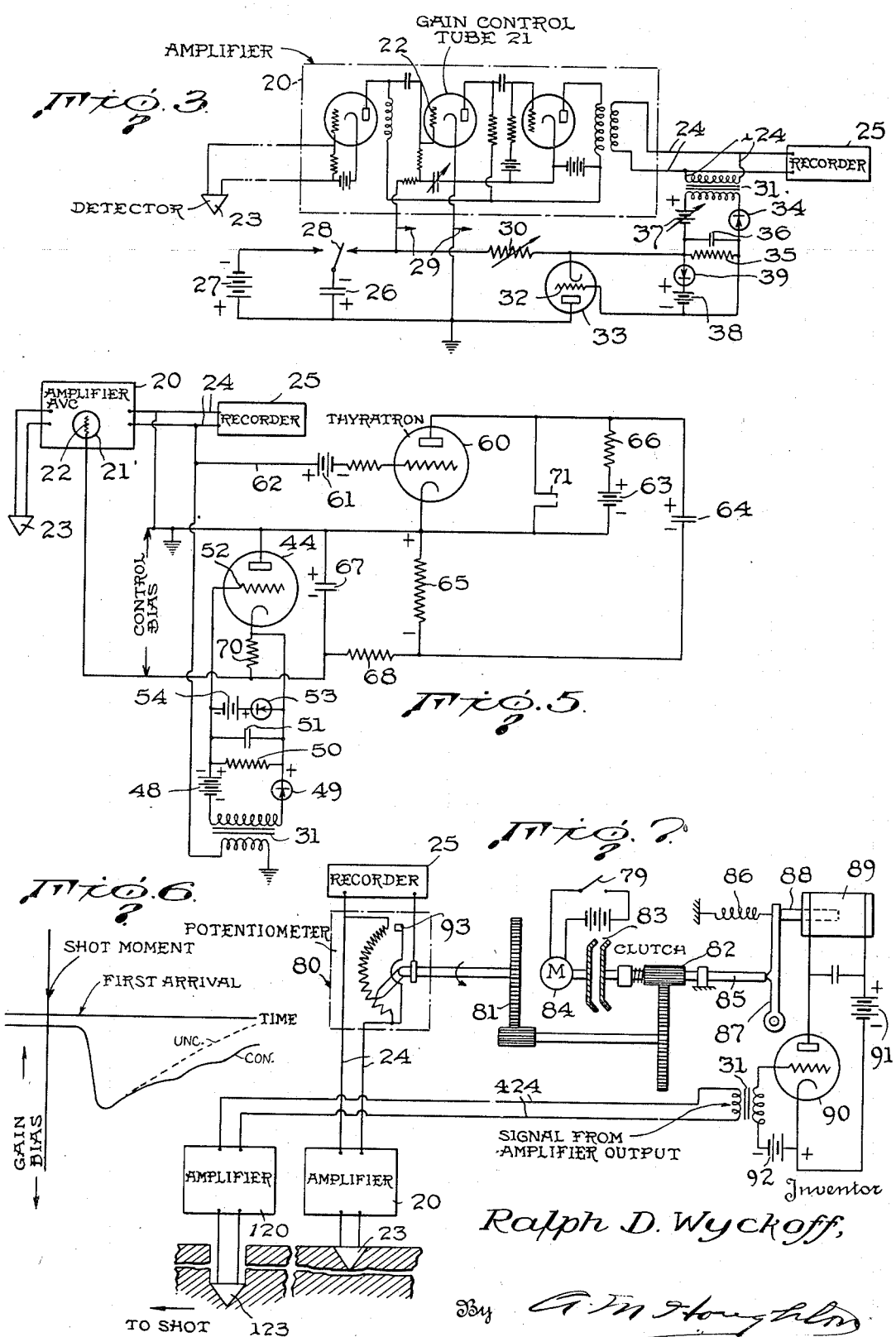

Patented Mar. 17, 1942

2,276,709

UNITED STATES PATENT OFFICE 2,276,709

APPARATUS FOR AND METHOD OF SEISMOGRAPH PROSPECTING

Ralph D. Wyckoff, Pittsburgh, Pa., assignor to Gulf Research & Development Company, Pittsburgh, Pa., a corporation of Delaware Application October 14, 1940, Serial No. 361,185

5 Claims. (Cl. 177—352)

This invention or discovery relates to apparatus for and methods of seismograph prospecting; and it comprises, in a seismograph including an amplifier for seismic detector signals and a recorder, expander means for increasing the seismograph sensitivity as a function of time, independently of signal energy, during receipt of seismic waves, and means operated by signal energy for suppressing the sensitivity-increasing action of the expander means on rise in signal energy above a predetermined level; and it further comprises a method of amplifying a series of seismic detector signals wherein the signals are amplified at progressively increasing gain and the increase in gain is arrested momentarily upon appearance of amplified signal energy above a predetermined amplitude; all as more fully hereinafter set forth and as claimed.

In seismograph prospecting a small scale artificial earthquake is instituted by firing a charge of explosive in the earth. Seismic waves thereby generated are detected at a plurality of points in the earth spaced from the charge, and the detected waves, converted into electrical signals, are amplified and recorded. From the records information can be obtained as to subsurface stratigraphy. The seismic waves undergo reflection and refraction at buried strata interfaces and other surfaces of discontinuity, and it is possible to compute from the records the depths of such interfaces and the like.

In reflection seismograph prospecting the waves as received at the detectors include an initial tremor (first arrival), the first break of which, that is the first appearance of wave energy, is often quite weak; followed closely by a very strong series of waves, which soon gives way to a series of overlapped decaying wave trains of progressively lower average amplitude. Typically, the amplitude of the received waves varies over a range of about 1000 to 1, during a period of three seconds or thereabouts.

This amplitude range is far too great for recording of all the vibrations at their correct relative amplitudes. For example, in the ordinary vibratory light beam oscillograph recorder, which records the waves as a wavy trace, if the apparatus is adjusted to make the width of the trace for the strongest waves within practical limits, say not more than 3 inches wide, then the trace for the first arrival and some of the later arrivals may be only 0.003 inch wide which is much too small for measurement. Usually the apparatus is adjusted to bring the trace for the later arrivals to a reasonably small width, say 0.5 inch. In this case the trace of the first strong group of waves goes clear off the record and is of little value.

In an effort to improve this state of affairs there have come into use automatic gain control amplifiers, which automatically reduce the amplifier gain for strong incoming signals and increase it for weaker signals. The gain at any instant depends on the average signal energy over a preceding short interval of time. However, such amplifiers cannot in practice be made to keep the ratio of amplitudes recorded to a value as low as is desired; less than 10:1 or thereabouts. The action becomes irregular if excess leveling of the signal amplitudes is attempted.

Another expedient which has found some use is the expander; a device which increases the sensitivity of the amplifier or recorder during receipt of the seismic waves purely as a function of time independently of signal energy. Such devices give a desirably smooth controlling action but suffer from a lack of flexibility. They cannot readily be made to vary the sensitivity in accordance with the actual rate of decay of waves in any particular situation. In fact, the sensitivity at any instant time may differ seriously from the optimum value; may differ by a factor as much as 10.

Attempts have been made to combine expanders with automatic volume control, by providing an amplifier including an expander and an automatic volume control in series so to speak so that the gain of incoming signals is increased purely as a function of time by the expander, and the signals leaving the expander are submitted to automatic volume control with variation of gain in an approximately inverse relation to signal amplitude. Such expedients however suffer from excessive complication and are not altogether satisfactory in operation.

According to the present invention there is provided an improved seismograph amplifier and recorder in which the gain or sensitivity at any instant conforms very closely to the ideal. The apparatus is capable of restricting the maximum recorded amplitude ratio to 10:1 or less, while preserving the wave shapes to a high degree, and with smooth and non-jerky operation.

The apparatus includes, in an amplifier, an expander adapted to increase the gain of the amplifier uniformly as a function of time during receipt of signals, and a supplementary control device adapted to inhibit or suppress the gain-increasing action of the expander temporarily upon receipt of momentarily strong signals. The expander is arranged to increase the gain at a rate somewhat higher than is normally employed, so that the desired inhibitory action is available at all times, as is explained in detail below. The expander is usually provided in the amplifier but can be provided in the recorder if desired.

As used herein the term expander is applied to devices for varying the effective amplifier or recorder sensitivity as a function of time, independently of fluctuations in signal energy.

In what is at present regarded as the best embodiment of the invention the expander is of the all electrical type and the control means therefor is electrical. A control tube is provided in the amplifier in such arrangement that the gain of the amplifier depends on the magnitude of a bias potential applied to the control grid of the tube, and means are provided for applying an initially high bias potential to the tube, for low gain, and causing the potential to leak off at a uniform rate, rather higher than in ordinary expander practice, with corresponding increase in amplifier sensitivity. The control means for the expander is such as to apply a blocking potential to the expander circuit, on development of high amplitude signal energy whereby the action of the expander is inhibited until the signal energy falls below a definite level. The expander and control means can be of the electromechanical type if desired.

Figure 2:
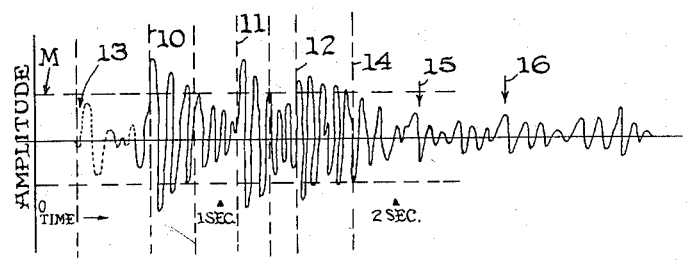
Figure 4:
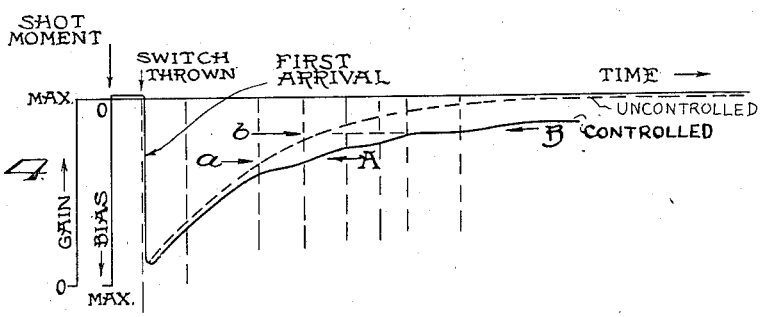
Figure 8:
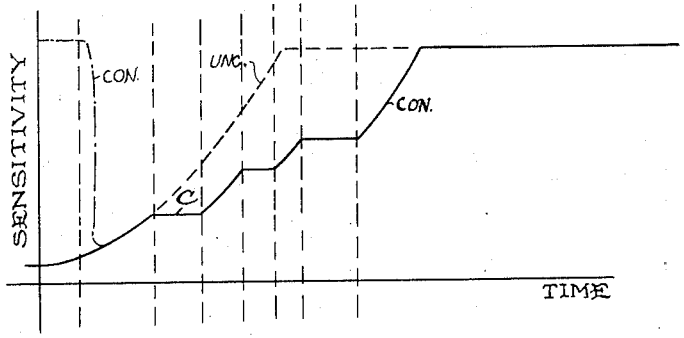

In the accompanying drawings there are shown diagrammatically several examples of apparatus within the purview of the invention, and charts illustrative of the results obtained by its employment. In the drawings:

Fig. 1 is a conventionalized reproduction of a typical seismogram such as is obtained by straight amplification, Fig. 2 is a similar reproduction of a seismogram obtained with the apparatus of the present invention, Fig. 3 is a diagram of one embodiment of the invention, Fig. 4 is a diagram illustrative of the electrical conditions in the circuit of Fig. 3, in producing a record as in Fig. 2, Fig. 5 is a diagram of a modification of the invention making use of a thryaton tube in the control circuits, Fig. 6 is a diagram illustrative of the electrical conditions in the circuit of Fig. 5 in producing a record as in Fig. 2, Fig. 7 is a diagrammatic showing of an electromechanical embodiment of the invention, and Fig. 8 is a diagram illustrative of the electrical conditions in the circuit of Fig. 7 in producing a record as in Fig. 2.

Referring to the drawings and more particularly to Figs. 1 to 4, Fig. 1 is illustrative of the amplitude range encountered in typical seismographic operations. Fig. 1 is typical of seismograph records obtained with a "straight" amplifier (gain constant during receipt of waves) adjusted for a moderate gain. A wave of tremendous energy may occur early in the record, as shown beginning at 10. Abruptly beginning, overlapping wave trains beginning at 11 and 12 of progressively less average energy occur later. After wave 12 the record dies down below readable amplitude. The first arrival appears at 13. By adjusting the amplifier gain to a higher level, say a 10-fold or 100-fold increase, waves subsequent to wave 12 may show up on the record, but group 10 will then go entirely off the record.

Fig. 2 shows a corresponding record of a similar wave series, obtained by use of the apparatus of the present invention. Waves 10, 11 and 12 appear, and in addition later arrivals 14, 15 and 16, and the first arrival 13, all at useful magnitude. The amplitude ratio in the record is kept at 10:1 or less.

Fig. 3 shows one convenient embodiment of the invention. An amplifier 20 is provided, shown in simplified form, including a tube 21 so arranged that the gain of the amplifier is determined by the potential at the grid 22 of the tube. As the potential at 22 is increased in the negative direction the gain is reduced.

This type of amplifier is known per se and requires no detailed description. The input is connected to a seismic detector 23 and the output, through leads 24, to a conventional recorder 25. Bias voltage on grid 22 is supplied from a battery 27 connected to a condenser 26 through a switch 28. By throwing the switch to the left the condenser is charged, and by throwing the switch to the right the condenser potential is applied to grid 22 in a direction to bias it. A resistor 30 is connected across the condenser, in a circuit including a tube 33 (see below), so that the bias potential on the grid gradually leaks off at a rate determined by the value of the resistor, discharge being practically complete in a few seconds. The amplifier gain tends to rise smoothly in a manner illustrated in dotted lines in Fig. 4. The rate of gain increase is made rather more rapid than in conventional systems, by suitable adjustment of resistor 30.

The control circuit to be described arrests this increase in gain whenever signal energy above a predetermined value appears.

Means are provided for blocking the discharge of condenser 26, and hence arresting the increase of gain, upon appearance of signal energy above a predetermined level. These means include a transformer 31 arranged to divert a portion of the amplified signal energy from leads 24, through leads 124, and apply it, through a rectifier 34, to the grid 32 of a tube 33, the plate circuit of which includes the resistor 30 and condenser 26 described above. The rectified signal current (direct current) appears across a resistor 35 and condenser 36. A delay bias battery 37, and a battery 38 in series with another rectifier 39, are connected as shown. The rectifier can conveniently take the form of copper-oxide or selenium rectifiers, or diode tubes.

In operation, switch 28 is thrown to the right as described, manually or automatically, shortly before the time of arrival of the first strong seismic waves at the detector, to apply a bias voltage to grid 22. The bias gradually decreases (i. e. the negative potential at grid 22 becomes less) and the gain increases as described in the manner shown in Fig. 4. If the sensitivity rises too rapidly in following the dotted curve, the amplifier output at the transformer 31 becomes sufficient to block the tube 33 and further discharge of condenser 26 is prevented until the signal amplitude drops. This blocking action is performed as follows. When the voltage of the signal peaks at the secondary of the transformer 31 exceed the voltage of battery 37, rectifier 34 passes current in its forward direction. The resulting (direct) current appears across resistor 35 and condenser 36, and a negative voltage is applied to grid 32 of tube 33. This reduces or stops discharge of condenser 26 and arrests the increase in amplifier sensitivity. When the signal voltage at the transformer drops, condenser 36 soon discharges and tube 33 drops to zero bias so that discharge of condenser 26 is limited principally by resistor 30.

When a signal of very large amplitude appears at the transformer, due to arrival of a very strong seismic wave, condenser 36 tends to become so highly charged that tube 33 remains blocked a long time. This is avoided by the provision of battery 38 and rectifier 39. When the bias voltage across condenser 36 exceeds a predetermined value it overcomes the delay voltage of battery 38, and permits the excess potential on this condenser to discharge rapidly through the rectifier. The signal amplitude level above which the control circuit inhibits the action of the expander is determined by the voltage of battery 37. Such level can be adjusted to any desired magnitude, for example at M in Fig. 2. If the voltage of battery 37 is increased, line M in Fig. 2 is elevated and vice versa. This amplitude level is selected with a view to the character of the record desired. As shown in Fig. 2 the level is set such that the gain-increase-arresting action does not take place with most of the waves, but only goes into effect with the very high amplitude waves.

The inhibited expander circuit described can be used to control a plurality of other amplifiers 20 (not shown), voltage being taken off at leads 29.

The function of gain versus time achieved in my amplifier depends on the manner in which the amplitude of received seismic waves varies with time, in the particular seismic operation in question, and accordingly differs widely in different operations. However, the function has certain general characteristics. The curve (solid line in Fig. 4) of gain or bias v. time follows the signal fluctuations except that the shift is always in one direction, viz. toward a reduction in negative bias, and an increase in gain, and the rate of change does not exceed the slope which the dotted line curve has at the same value of bias. That is to say, the slope at A in the solid curve does not exceed the slope at a in the dotted curve; similarly at B and b, etc.

In many cases it is desirable to provide a high amplification for the first wave to arrive at the detector, which is usually weak; followed by a sharp reduction in amplification and then a gradual increase as described. This can be achieved by manipulating a switch 28 at the proper time, that is just after receipt of the first arrival and before receipt of the first strong waves. It is more convenient, however, to achieve this effect electrically. Figs. 5 and 6 illustrate a modification of the invention, utilizing a thyratron tripping device, for accomplishing this end. With this system the first arrival is recorded, as indicated in dotted lines at 13 in Fig. 2. The circuit includes a thyratron tube 60, receiving a signal diverted from the amplifier output. A thyratron is a gas-filled triode tube of construction such that no plate current flows when the grid is biased above a certain definite value. On reduction of grid bias below this value plate current suddenly begins to flow. This action is called tripping the tube. When plate current once begins, the grid has no control thereover. The thyratron is biased by means of battery 61 so that no plate current flows until an amplifier output signal is received from lead 62. The plate voltage of the thyratron originates in a battery 63 which charges condenser 64 through resistances 65 and 66. The latter resistance is made high so that little current can flow through it when the thyratron becomes conductive. When the thyratron is tripped, condenser 64 is discharged through resistor 65. Condenser 67 is charged quite rapidly through resistor 68 by the voltage across resistor 65. The thyratron resistance remains low compared to resistor 65 and condensers 64 and 67 are practically in parallel with resistance 65. In the absence of tube 44, the condenser charges would leak very slowly through resistor 65. However, tube 44 is at zero bias in the absence of signal and therefore allows condensers 67 and 64 to discharge quite rapidly as determined by the resistance 70 which is much lower than resistance 65. Tube 44 allows the condensers to be discharged at any desired rate between the values determined by resistors 65 and 70. The rate is determined by the bias on the grid of tube 44. This is obtained as described for the circuit of Fig. 3 and the operation is practically the same after the control bias has been built up by the thyratron circuit. The bias-time functions are plotted in Fig. 6. The dotted curve shows the decrease in bias on control grid 22, and the increase in gain, in the absence of the inhibiting action, and the solid curve shows the bias decrease and gain increase as modified in receipt of typical wave trains as in Fig. 1. After the thyratron trips, it remains conductive, and a feeble current continues to flow from battery 63 through resistor 66 and the tube. By closing a switch 71 for an instant after the seismic record is completed, the thyratron plate voltage is made zero and the arc stops. The tube becomes non-conductive and current from battery 63 can leak through resistor 66 into condenser 64 and through resistor 65. In several seconds condenser 64 will be fully charged and ready for use again.

If desired, the thyratron may be omitted, and switch 71 used directly in its stead. It may be closed manually or by a relay at any desired instant, usually immediately after receipt of the first arrival. In some cases the operator has sufficient time to do this while observing the arrivals at the recorder.

The invention can also be embodied in an electromechanical system, as shown in Fig. 7. Fig. 7 also serves to show the expander operating on the recorder input rather than within the amplifier proper. A potentiometer 80 of the rotary type is interposed in leads 24 as shown, operable through speed reducing gearing 81 and 82, a clutch 83 on a shaft 85 and a motor 84 controlled by a switch 79. A spring 86 operating on a lever 87 engaging the end of the shaft normally keeps the clutch engaged. The lever carries an iron plunger 88 entering a solenoid 89 connected in the plate circuit of a vacuum tube 90, in circuit with a battery 91. The grid circuit of the tube receives an amplified detector signal output as shown through leads 424, a bias battery 92 being included in this circuit.

In operation, switch 79 is closed at some suitable instant such as the instant the shot is fired, thereby causing actuation of the potentiometer in the direction shown with progressive increase in net amplification of the signal as received at the recorder; Fig. 8. The tube delivers current at the solenoid, sufficient to disengage the clutch, whenever the voltage at 31 exceeds the bias of battery 92. After each recording the device is reset, as by disengaging the gearing and moving the potentiometer shaft to its zero position.

In the apparatus of Figs. 3 and 5 the control voltage is shown as taken off from the amplifier output circuit. In some cases it is desirable to have the expander-inhibiting energy supplied slightly before receipt of a corresponding signal at the amplifier, so that the action of the inhibitor for a given high-energy anticipates the receipt of the signal. This can be accomplished conveniently by taking the expander-inhibiting energy not from the output of the same detector-amplifier, but from the output of a detector-amplifier nearer the shot; one which receives a given wave slightly earlier. This expedient, which in its broad aspect is the invention of another, is illustrated in Fig. 7, wherein transformer 31 is connected not to leads 24, as in Fig. 3, but to leads 424 from an amplifier 120 which receives the output of a detector 123 spaced closer to the shot (not shown) than detector 23, and advantageously buried somewhat deeper in the earth than detector 23 so as to be the first to receive both the fairly horizontal waves (early arrivals) and waves coming up steeply from below (later arrivals). The same expedient can be employed with the circuit of Fig. 3, for example; the primary of transformer 31 can be connected to an advance detector-amplifier 120, 123 as in Fig. 7. In Fig. 7 leads 424 can be connected to leads 24, as in Fig. 3, if the anticipating action is not desired.

Fig. 8 illustrates the actions taking place in the operation of the apparatus. The actual sensitivity curve (solid line) departs from the curve (dotted line) which would be obtained by operation of the potentiometer in the absence of the control mechanism; whenever the signal amplitude exceeds a predetermined value, determined by the voltage of bias battery 92, a flat spot appears on the sensitivity curve as at C. When the signal amplitude drops below the critical value M (determined by the voltage of battery 92) the potentiometer goes into action again and the sensitivity begins to increase again. The sensitivity curve is stepped as shown but never deviates far from the ideal. The seismograph record produced resembles that of Fig. 2.

In case it is desired to record the first arrival, potentiometer 80 is simply arranged so that the gain will be high initially, as by providing a contact point 93 such that at the initial position of the potentiometer the amplifier leads 24 are connected directly to the recorder. The sensitivity curve of Fig. 2 then has its initial portion as represented by the dot-dash line.

While the amplifier has been described principally in connection with reflection seismograph it can be employed in other geophysical prospecting systems including refraction work and acoustical well logging systems. The recorder can be of the linear trace type, which is at present the most usual system, or of other types such as variable density systems. The seismic detectors can be of any suitable construction; they can be of known types responding to the amplitude, or the velocity, or the acceleration of seismic tremors. The invention is not limited to the particular amplifying circuit shown but is applicable to all the usual seismograph amplifying circuits including heterodyne circuits, push-pull circuits, etc. One of the controlled expanders of the invention can be provided for each amplifier of the seismograph assemblage, or can be arranged to control a plurality of the amplifiers.

What I claim is:

1. In a seismograph circuit including an amplifier for seismic detector signals, a recorder and an expander in said circuit adapted to increase the sensitivity thereof as a function of time, substantially independently of fluctuations in original energy, during the period of receipt of seismic waves, the improvement comprising means adapted on supply thereto of energy of predetermined selected amplitude to arrest the sensitivity-increasing action of the expander, said selected amplitude being such that the arresting action goes into effect only for relatively high amplitude signals which tend to exceed the useful amplitude range of the recorder; and circuit means for applying signal energy to said means.

2. In a seismograph circuit including an amplifier for seismic detector signals, a grid-controlled tube in the amplifier adapted to adjust the amplifier sensitivity in accordance with grid potential of the tube, and an energy-carrying circuit adapted to apply a potential to said tube varying with time in such manner as to increase the amplifier sensitivity with time independently of signal amplitude fluctuations, said circuit being constructed and arranged to have its potential-varying action blocked upon application thereto of energy, the improvement comprising circuit means receiving signal energy and connected to the expander in such manner that increase in signal energy above a predetermined value blocks said potential variation; said predetermined value being such that the blocking action takes place only with relatively high amplitude signals while signals of moderate amplitude do not cause said blocking action.

3. In a seismograph circuit including an amplifier for seismic detector signals, a grid-controlled tube in the amplifier adapted to adjust the amplifier sensitivity in accordance with grid potential of the tube and an energy-carrying circuit adapted to apply a gradually decreasing potential to the grid whereby the amplifier sensitivity increases with time independently of signal amplitude fluctuations, said circuit being constructed and arranged to have its potential decreasing function arrested upon application of energy to said circuit, the improvement comprising vacuum tube circuit means including a rectifier, receiving signal energy and delivering amplified rectified energy to said energy-carrying circuit in a direction opposing said potential decrease and bias means for said vacuum tube adapted to prevent such delivery until amplified signal energy exceeds a predetermined value corresponding to a signal amplitude level above which signals cannot be usefully recorded.

4. A method of amplifying a series of seismic detector signals which comprises amplifying signals at a gain progressively increasing with time and independently of fluctuations in signal amplitude, and arresting the gain increase upon appearance of amplified signal energy above a predetermined selected amplitude corresponding to a signal amplitude level above which signals cannot usefully be recorded.

5. A method of amplifying a series of seismic detector signals of amplitude which is sometimes below and sometimes above the maximum level which can be usefully recorded, the average amplitude of the signals being relatively high in the early part of the series and declining to a relatively low value in the later part, which comprises amplifying the signals independently of amplitude fluctuations at a gain increasing as a function of time from a value relatively low in the early part of the series to a value relatively high in the later part, and maintaining the rate of gain increase substantially zero whenever signals occur of amplitude corresponding to said amplitude at which signals cannot be usefully recorded.

RALPH D. WYCKOFF.